Patented July 20, 1948

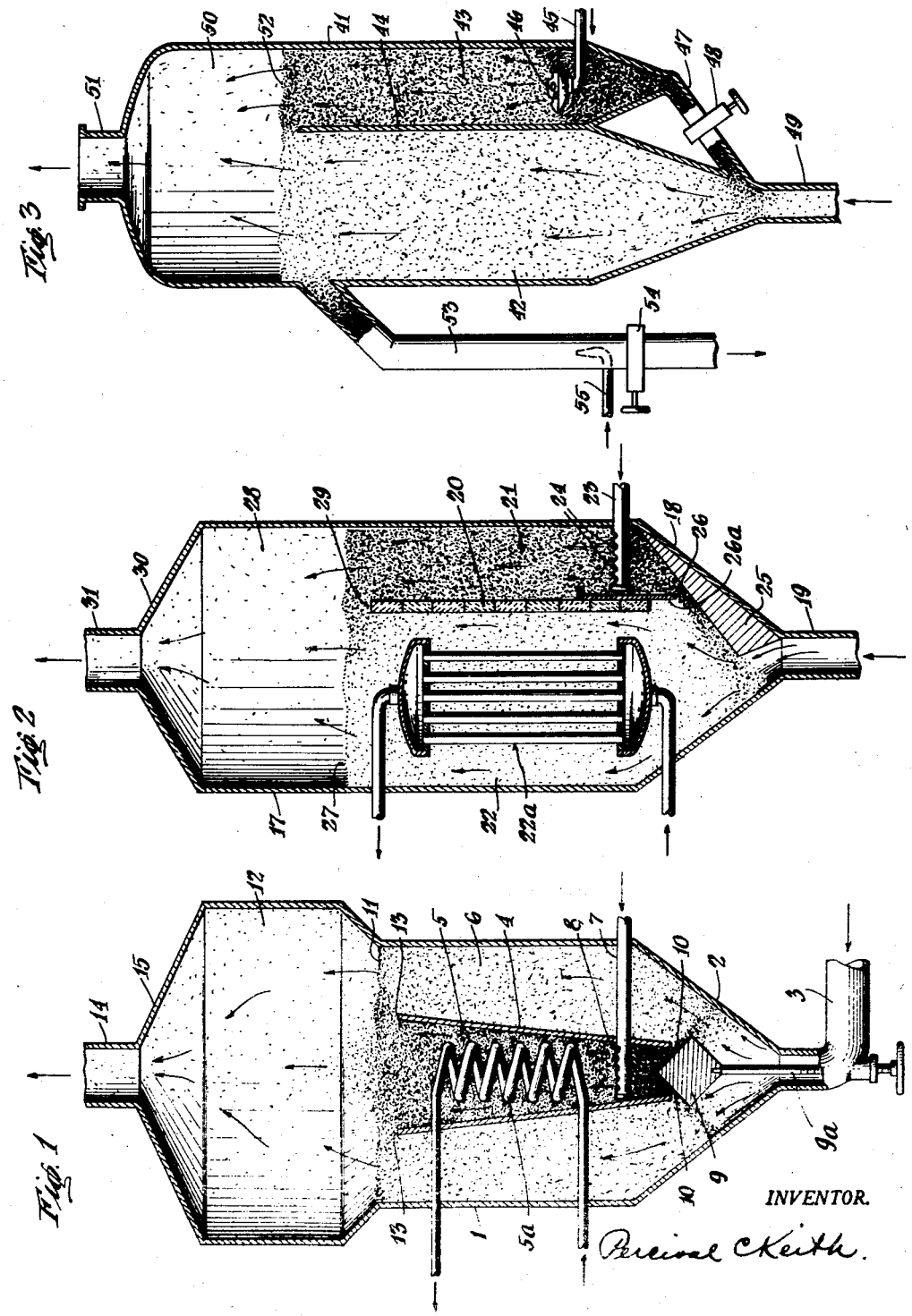

2,445,327

UNITED STATES PATENT OFFICE 2,445,327

FLUIDIZING PROCESS FOR GASIFYING CARBONACEOUS SOLIDS

Percival C. Keith, Peapack, N. J., assignor to Hydrocarbon Research, Inc., New York, N. Y.

Application August 2, 1944, Serial No. 547,722

3 Claims. (Cl. 196—56)

This invention relates to a process for the pyrolytic distillation and exothermic gasification of solid materials having volatilizable components and solid, carbon-containing residues. More particularly, the invention pertains to a fluidizing process for the treatment of such solid carbonaceous materials in finely divided form.

In recent years, the technique of conducting catalytic reactions by the passage of reactant gases or vapors through a bed of powdered catalyst at such velocities that the powder becomes suspended in the gas but exhibits what has been termed "hindered settling" so that a relatively small proportion of the powder is carried out of the reactor, has been developed rapidly and extensively for petroleum processing. This technique of fluidization, as it is more commonly called, which keeps a mass of powdered material in a fluid, agitated state resembling a boiling liquid and which permits the establishment of a pseudo-liquid level between the aerated mass and the gas space above it, is the basis of the "fluid catalyst" process that has attained prominence in the manufacture of aviation gasoline. Another view of fluidization may be stated as the technique by which reactant gases and solids are passed through a reactor under such conditions that the residence time of the solids in the reactor is longer than that of the gaseous reactant. The fluid catalyst process has been widely publicized, e. g., in Industrial and Engineering Chemistry, pages 768 to 773, July 1943. A fluid cracking plant comprises two major elements, a reactor and a regenerator. The remainder of the plant is largely composed of standpipes, cyclones, hoppers, pipes, blowers, etc., which are used to interconnect the reactor and regenerator and to maintain circulatory flow of the fluid catalyst through these units. The transfer of solids from a reactor by entrainment in the effluent gases has been prevalent practice but recently transfer by draw-off of solids has gained favor because of several operational advantages. For example, the draw-off of solids, which is like the draining of a liquid from a tank, makes it possible to use smaller cyclone separators and lower aeration velocities. On the other hand, transfer by entrainment necessitates higher aeration velocities which produce greater erosion, increase the size of reactors and restrict the allowable variations in operating conditions.

The desirability of connecting two fluidizing reaction zones in a simple and compact manner has found expression in the proposals of recent patents. One patent discloses a fluidizing reactor with converting and regenerating zones so disposed that one zone is vertically over the other. A similar arrangement of two fluidizing reaction zones as well as another arrangement in which the zones are side by side and are interconnected by internal standpipes are described in another patent. Both proposals for the vertical arrangement of the zones depend on the gravitational discharge of the fluid catalyst from the upper zone into the lower one and on the elevation of the catalyst from the lower zone to the upper one by entrainment in an ascending gas stream. Besides the disadvantages of transferring solids by entrainment, the apparatus and method of operation disclosed in these patents are still relatively intricate and cumbersome. Similar observations may be made of the side-by-side arrangement of two reactors with internal interconnecting standpipes.

A principal object of my invention is to simplify fluidizing processes involving two reaction zones.

Another primary object is to provide an improved fluidizing process in which the solid is cyclically treated with different gases in two zones.

A further object of the invention is to facilitate the circulatory flow of solids through the two zones.

Another object is to obviate the multiplicity of equipment and the attendant operational difficulties encountered in processes having two interconnected fluidizing reactors.

As a further object, with compact apparatus, I avoid or minimize the heat losses which result from transporting the fluidized solids from one reactor to another; accordingly, my aim is to improve the thermal efficiency of such processes.

These and other objects of my invention will be apparent from the description which follows.

Basically, my invention involves the processing of coal, lignite, oil shale, wood, and like carbonaceous solids under fluidizing conditions in a unitary vessel of which the lower portion is divided by internal baffling into two contiguous reaction zones and of which the upper portion is a space wherein the two reaction zones become merged. The two reaction zones also merge in their lower regions through a suitable channel. The upper space and the lower channel therefore provide connection or contiguity of the two zones. In other words, the two intimately associated zones are in open communication with each other. In operation, the two zones are filled with a fluidized solid and are maintained at different fluid-static heads. Under these conditions, the comminuted solid flows down the zone of greater fluid-static head, through the bottom channel, up the zone of lesser-fluid-static head, and through the upper space to the zone of greater head, thus completing its cyclic movement. By fluid-static head I mean a pressure condition which is comparable to a hydrostatic head in a liquid system; a fluid-static head is readily altered by changing the aeration velocity. Accordingly, different aeration velocities may be used in the two reaction zones of my invention to create a difference in fluid-static heads. Because of this difference in heads, a continuous cyclic flow of the comminuted solid is maintained automatically. While different gases are introduced into the two zones to fluidize and react with the circulating solids, all of the reaction product gases become commingled in the upper space of the unitary vessel. The latter gases and entrained particles of the treated solids discharge from the upper space through suitable separators, such as cyclones and electrical precipitators, which recover the solids from the effluent gases. Depending upon the objectives of a given operation, the recovered solids may be returned to the unitary vessel, e. g., by conveying them in suspension in one of the feed gases, or they may be sent to product storage. Powdered solids are withdrawn during the operation of the process at a rate to compensate for the feed of fresh solids and thus maintain a substantially constant volume of solids in the reactor in the course of operation.

To clarify and explain my invention more fully, reference is made to the drawing attached to this specification, of which:

Figures 1, 2 and 3 are vertical sectional diagrams of different forms of reactors suited for the process of the invention.

The apparatus illustrated in Figure 1 comprises an upright cylindrical vessel 1 with a frusto-conical bottom 2 to which pipe 3 is attached for the admission of a gasiform stream such as a recycled portion of gases produced by the process. Within vessel 1, there are a central zone 5 formed by frusto-conical baffle 4, containing in a relatively dense but fluidized condition carbon-containing residue particles which are undergoing exothermic gasification, and an annular zone 6 containing in a relatively dense and fluidized condition the same carbon-containing residue particles which are promoting the pyrolytic distillation of fresh coal particles introduced thereinto. If desired, baffle 4 may be nearly cylindrical. Oxygen of not less than about 95% by volume purity is fed through pipe 7 and ports or nozzles 8 into zone 5 where it exothermically gasifies the carbon in the residue particles and thus produces carbon monoxide and heat; the oxygen is reacted by the time it reaches the top of gasification zone 5. The residue particles tend to de-aerate as they move into the region below the oxygen feed pipe 7. This settling tendency is beneficial since it prevents the oxygen from flowing down rather than up through zone 5. A deflector 9, formed of two cones joined at their bases, is set below the frusto-conical baffle 4 on a movable support 9a so as to provide an adjustable opening or channel 10 between the upper cone of the deflector 9 and the lower edge of the frusto-conical baffle 4. As controlled by the clearance 10, the residue mass of higher density zone 5 naturally flows into the surrounding zone 6 of lower density. The lower cone of deflector 9 shields zone 5 from the incoming gasiform stream carrying in suspension finely divided coal by deflecting the stream away from the opening 10. The deflected stream rises through the annular zone 6 and causes fluidization of the powdered mass. The resulting contact of the coal particles with the hot residue particles effects the pyrolytic distillation of the volatilizable components in the coal. The fluidized body in both zones has a pseudo-liquid level 11, at which point or, better stated, region, the gasiform stream including the pyrolytically distilled volatilizable components of the coal as well as the carbon monoxide resulting from the gasification of the carbon in the residue particles disengage themselves from the bulk of the fluidized mass. These gasiform streams from the distilling and gasifying zones merge in space 12 above the fluidized mass. Space 12 is preferably of enlarged diameter so that the velocity of the effluent gases is decreased and, in turn, the entrainment of the particles is curtailed. It is clear that as the heavier column of fluidized particles in zone 5 flows downward discharging into zone 6, the lighter column of fluidized particles in zone 6 rises and surges over the edge 13 of the baffle 4 into zone 5. In this manner a continuous cyclic flow of carbon-containing residue particles is maintained through the gasifying and distilling zones of vessel 1. The mixture of gases in space 12 carrying a desired quantity of residue particles flows out through pipe 14 set in head 15 of vessel 1. The quantity of solids withdrawn from vessel 1 by entrainment is made to compensate for the quantity of fresh coal particles entering vessel 1 by way of pipe 3 and thus maintain a substantially uniform volume of fluidized mass in vessel 1 during the operation of the process.

The issuing gases may be conducted to suitable separating devices like cyclones and electrical precipitators wherein the entrained particles are removed from the gas stream. The dust-free gases emerging from the separator are then passed through conventional fractionating and condensing equipment to yield desired liquid and gaseous products.

Referring to the form of apparatus typified by Figure 2, vessel 17 may be of such shape that its horizontal cross-section is oblong or circular as was the example presented in Figure 1. Vessel 17 has a tapered bottom 18 into which pipe 19 is sealed for the introduction of oxygen. Within vessel 17, there is a baffle 20 which may be constructed of refractory brick and which separates contiguous zones 21 and 22. Powdered oil shale suspended in a carrier gas is fed through pipe 23 and openings 24 into space 21 where it contacts hot residue particles deriving from the pyrolytic distillation of the oil shale. The contact of the fresh oil shale particles with the hot residue particles leads to the pyrolytic distillation of volatilizable components from the fresh oil shale particles. A wedge-like or other properly shaped deflector 25 guides the incoming oxygen into zone 22 and away from zone 21. Between deflector 25 and the bottom of baffle 20 there is the opening 26 which may be varied by shutter 26a and through which residue flows to meet incoming oxygen. The oxygen reacts with the carbon in the residue particles and thus produces the valuable gas, carbon monoxide, and generates the heat required in the contiguous pyrolytic distillation zone. The settling of residue particles below feed pipe 23 ensures against the escaping of pyrolytically distilled volatilizable components through opening 26. The respective aeration velocities used in the two zones are such that there is a greater concentration of residue particles in zone 21 than in zone 22. Accordingly, the fluidized mass will naturally flow from the higher density zone 21 into the lower density zone 22 through the slot opening 26 and the flow may be controlled by adjustment of shutter 26a. It may be desirable to introduce some steam below feed pipe 23 in order to strip absorbed volatilizable components from the residue particles before they pass into the gasifying zone 22. The fluidized mass of residue particles in both the gasifying and distilling zones has a pseudo-liquid level 26 which is the boundary region in which the gases become disengaged from the bulk of the mass. The volatilizable components in gaseous form from the pyrolytic distilling zone 21 and carbon monoxide from the gasifying zone 22 become commingled in space 28 above the body of fluidized solids. With a downward flow of solids in zone 21, the column of solids undergoing exothermic gasification in zone 22 rises with the result that it spills over the upper edge 29 of baffle 20 into zone 21 where the thus heated residue particles contact fresh oil shale particles and promote the pyrolytic distillation of volatizable components from the oil shale. The mixed gases in space 28 rise to the top 30 of vessel 17 and escape through pipe 31. As mentioned in the case of the operation described relative to Figure 1, the gases emerging from the reactor through pipe 31 carry a quantity of residue particles corresponding to the quantity of fresh oil shale particles introduced into the reactor by way of pipe 23. Conventional separators may be used to remove the entrained residue particles from the gaseous effluent which may then be conducted to condensing and fractionating equipment to recover valuable liquid hydrocarbons and fuel gases.

In the foregoing illustrative examples, it is obvious to those skilled in the art that considerably more heat may be evolved by the exothermic gasification of the carbon in the residue particles than is required for pyrolytic distillation of volatilizable components from the fresh carbonaceous solids. Any of a number of known procedures for removing excess heat can be employed. I usually prefer to place heat exchange surfaces within the fluidized mass since the high turbulence of the mass yields a high rate of heat transfer from the mass to the cooling surfaces. By reason of this same turbulence, temperatures throughout a given reaction zone are very quickly equalized so that a uniform temperature prevails. For simplicity of demonstration, I have shown a cooling coil 5a disposed in zone 5 of the reactor in Figure 1 and a bundle of cooling tubes 22a in zone 22 of the reactor in Figure 2.

As mentioned hereinabove, I maintain circulation of the powdered mass in my unitary reactor with its two contiguous zones by using different aeration velocities in the two zones; the resultant difference in fluid-static heads drives the powder along its circulatory course. For instance, in either of the examples that have been described above, the gases passing through the zone having a higher density of solids might have an average velocity of about 0.3 foot per second, while the average aeration velocity through the other zone of lower solids concentration might be about 1.5 foot per second. The rate of flow or transfer of powdered material from one zone to the other in cyclic fashion is dependent upon the difference between these two aeration velocities and, more directly, upon the difference between the resultant fluid-static heads of the two zones of my reactor. The size of the lower opening or channel between the two zones is, of course, another factor that may be controlled to vary the cyclic flow of powder, since it functions like a valve in a liquid pipeline.

Figure 3 represents a vessel 41 in which the two contiguous zones 42 and 43 are separated by baffle 44. Pipe 45 and perforated distributor 46 are employed to feed the gaseous reactant to zone 43. The tapered bottom of zone 43 has a tubular extension 47 with a slide valve 48, discharging into the tapered bottom of zone 42. The gaseous reactant for zone 42 is introduced through pipe 49. Solids dropping through tube 47 into the bottom of zone 42 are whirled about by the incoming gaseous reactant in zone 42. The reaction gases of zones 42 and 43 meet in the upper zone 50 and jointly leave the apparatus through outlet 51.

To illustrate the use of this apparatus, reference will be made to a process for the carbonization and gasification of coal. Coal pulverized to pass about a 100-mesh screen is carried suspended in fuel gas into zone 42 by way of pipe 49. As this stream of gas and powdered coal passes up into zone 42, hot pulverized coke from zone 43 flows through channel 47 and becomes thoroughly mixed with the incoming powdered coal. The mixing of the hot coke and powdered coal by fluidization causes the volatile content of the coal to be driven off and, accordingly, the coal undergoes carbonization and gasification. Some of the coke produced during the distillation flows over baffle 44 into zone 43 where it is fluidized with oxygen introduced through pipe 45. The resultant combustion raises the coke particles to an incandescent heat or any desired temperature. If desired, combustible gas, e. g., methane plus oxygen, may be used to heat the distillation residue particles. This alternative is of particular value in operations where the residue is poor in combustible matter and rich in mineral matter. By maintaining a relatively low aeration velocity in zone 43, the fluidized mass therein is made to exert a greater fluid-static head than in zone 42. Under the difference in fluid-static heads, the coke particles flow down zone 43, through channel 47 and up zone 42 in a cyclic fashion, conveying the heat required for the distillation of the fresh coal feed. The reaction gases of zones 42 and 43 which meet in the upper space 50 carry some of the solids with them. These mixed gases leave the apparatus through pipe 51 and pass through suitable separators which segregate the carbonaceous particles from the gases. The gases thence proceed to the usual condensers and separators to recover tar, light oil and other condensables. The residual gas which comprises methane, carbon monoxide and hydrogen is a valuable and convenient fuel. Some of this fuel gas is recycled to the apparatus in order to introduce the powdered coal through pipe 49. The powdered coke which is removed from the effluent gases may be converted into briquettes suitable for domestic furnaces or it may be utilized in any one of several industrial processes. Another convenient way of withdrawing coke from the apparatus is to use a discharge standpipe 53 so connected to vessel 41 as to permit the drainage of powder. A slide valve 54 or other similar device controls the flow of coke from the apparatus. Aeration tube 55 above valve 54 is used to introduce a stream of aeration gas, e. g., recycled fuel gas, so as to keep the solids in standpipe 53 fluid and thus prevent clogging.

Typical of the operating conditions for the foregoing illustration is the use of oxygen of not less than about 95% purity flowing up through zone 43 with a linear velocity of about 0.3 foot per second. The rate of flow of hot coke through channel 47 and the rate of introduction of fresh feed coal through pipe 49 are so proportioned that about nine parts of hot coke enter the distillation zone 42 for every part of fresh coal. The average velocity of the gases in zone 42 is about 1 foot per second; at this velocity an appreciable proportion of the coke particles are carried out of the apparatus by the effluent gases. The rate of withdrawal of solids by this means as well as through discharge pipe 53 counterbalances the rate at which solids tend to accumulate because of the introduction of coal through pipe 49. As in previous examples, the difference in fluid-static head between zones 42 and 43 sustains the automatic circulation of solids through the two zones. Pseudo-liquid level 52 is the region in which the gases are released from the bulk of the fluidized masses in zones 42 and 43.

While for brevity, zone 42 has been referred to as the distillation zone, it is known that pyrolytic conversions, e. g., cracking of hydrocarbons, take place during the distillation or pyrolysis of coal or other solids having volatilizable components. In fact, zone 42 is a reaction zone and its temperature is controlled to give a desired distribution of products, like tar acids, bases, hydrocarbons, etc. The effects of high- and low-temperature carbonizations on product distribution have been widely reported. The temperature in my reaction zone 42 may be made to fall in either the high- or the low-temperature range for coal carbonization. If I desire to conduct low-temperature carbonization, say at about 1050° F., I may so control the temperatures and proportions of the hot coke, coal feed and recycled gas which enter zone 42, that the reactive mixture attains the chosen temperature. The fluidizing technique is particularly adapted for quickly bringing the several components in reaction zone 42 to the desired temperature.

The above-described method of distillation or pyrolysis is applicable to other solids having volatilizable components, like lignite, wood, oil shale and tar sands.

Similarly, as described and claimed in my copending application Serial No. 581,921 filed March 9, 1945, heavy hydrocarbons like oils, tars and pitches are pyrolized to volatilizable components and a solid residue of coke. Hydrocarbons are introduced in discrete form into a pyrolysis or distillation zone containing a fluidized mass of hot coke residue; the coke formed in the pyrolysis zone flows into a contiguous zone wherein it is partially burned in fluidized condition by introducing oxygen and, thus heated, flows back into the pyrolysis zone to convey the heat required for the pyrolysis of incoming hydrocarbons. Circulation of the hot coke is maintained by establishing unequal fluid-static heads in the contiguous zones. Coke produced in excess of the heat requirements of the pyrolysis is withdrawn from the system by entrainment or drawoff, or both. The hydrocarbons are fed in discrete form by spraying or atomization. Hydrocarbons of high viscosity or solid hydrocarbons may be preheated to render them sufficiently liquid to permit spraying. Some hydrocarbons can be pulverized and therefore may be charged into the pyrolysis zone in powdered form.

In operations, such as the pyrolytic distillation of coal or heavy hydrocarbons in which the circulating solid is derived from the feed material, provision can be made to maintain the desired average particle size by withdrawing from the bottom of the unitary vessel the larger particles which tend to settle out. If desired, these larger particles may be ground and screened, and the particles of proper size may be returned to the vessel.

When feeding a solid with a high content of volatilizable matter into a pyrolysis zone, it may not be necessary to use a carrier gas, e. g., recycled product gas, to introduce the solid and maintain it fluidized in the pyrolysis zone. In such cases, it may be possible to charge the pulverized solid by pumping it into the bottom of the pyrolysis zone with a device like the Fuller-Kinyon pump; the gases and vapors generated in the pyrolysis zone would maintain fluidization therein.

My invention is not predicated on the use of special particle sizes, temperatures, pressures, velocities, contact times, etc., and, accordingly, no attempt is made to define the operable ranges for such process factors. Furthermore, these data vary with the reactions and are known to those skilled in the arts. The examples set forth typical values of these factors.

A fluid-static head is dependent upon the density (total weight of powder and gas per unit volume of fluidized mass) and the height of a fluidized mass. The density of a fluidized mass is in turn dependent upon such variables as solid density, size and shape, and gas density, velocity, and viscosity. Gas density and viscosity may be altered by changes in temperature and pressure. While any one or any combination of the direct and indirect variables may be utilized to create a difference in the fluid-static heads of the two reaction zones of my unitary apparatus, for simplicity and ease of operation, I generally rely on aeration or gas velocity as the chief variable in the attainment of different fluid-static heads.

For the purposes of my invention, it is desirable that the difference in fluid-static head between the two reaction zones be not less than about 1 pound per square inch, and preferably not less than about 3 pounds per square inch. Such pressure differences promote satisfactory circulation of the fluidized solids through the two zones.

The technique of fluidization by which comminuted solids are so treated with gases or vapors that the mass of solids is mobile and seething like a boiling liquid is already well developed and understood. Those skilled in the art know that any desired state of fluidization is attainable by controlling and balancing the various factors, like particle size, solid density and gas velocity. Thus, various investigators of systems involving fluidization have advised the use of powders having a particle size of about 100 to 400 mesh as well as powders considerably coarser and finer. Similarly, aeration velocities in the range of about 0.05 to about 5.0 feet per second are generally recommended. As previously indicated, the values selected for any given reaction depend upon other factors, like density of the solid treated and shape of the particles.

Conforming with general practice in the fluidization art, the terms fluid and fluidized, are herein used interchangeably. For the purposes of this invention, systems which are said to be fluid or fluidized are not intended to involve suspensions of comminuted solids in liquids. Also, aeration is to be interpreted broadly as the supplying or charging of any gas or vapor to fluidize a mass of powder.

Obviously, many modifications of the basic process and apparatus of my invention will suggest themselves to those skilled in the art. For example, my unitary apparatus with its two reaction zones might comprise a large cylindrical vessel in which the central cylindrical or frusto-conical baffle might be replaced by a multiplicity of smaller cylindrical or frusto-conical baffles distributed within the vessel; one zone would be that surrounding the several baffles and the other zone would be the sum of the spaces within the baffles. Furthermore, the term, unitary apparatus, comprehends apparatus which, because of large size, would be more conveniently assembled from several sections.

The above description and examples have been set forth with the purpose of being illustrative. Variations of my invention, conforming to its spirit, are to be considered within the scope of the claims.

What I claim is:

1. A process for the simultaneous pyrolytic distillation and exothermic gasification of a solid material having volatilizable components and a solid, carbon-containing residue, which comprises injecting said solid material in discrete particle form into one zone of a single fluidized mass of solid residue particles deriving from said solid material, maintaining said zone at an elevated temperature to effect pyrolytic distillation of volatilizable components from said solid material, pyrolytically distilling said volatilizable components from said solid material by contact with said fluidized mass, introducing oxygen of not less than about 95% by volume purity into another zone of said fluidized mass, both said zones being laterally contiguous and being in merging relationship to permit the free movement of the fluidized residue particles therebetween, reacting said oxygen with said fluidized mass in the last said zone at an elevated temperature above the first said temperature to gasify exothermically carbon contained in said fluidized mass, promoting and controlling circulation of said fluidized mass by maintaining unequal gas velocities through said merging zones to convey heat from the last said zone to the first said zone and thus to maintain the first said temperature in the first said zone, withdrawing from said fluidized mass a single gaseous effluent containing the pyrolytically distilled volatilizable components and the products of the exothermic gasification, and withdrawing from said fluidized mass excess residue particles.

2. The process of claim 1 wherein the solid material is coal.

3. The process of claim 2 wherein the circulation of said fluidized mass of residue particles is at a rate such that at least about nine parts of said residue particles flow from the last said zone to the first said zone for each part of said coal injected into the first said zone.

PERCIVAL C. KEITH.

REFERENCES CITED

The following references are of record in the file of this patent:

UNITED STATES PATENTS

| Number | Name | Date |
|---|---|---|
| 1,453,479 | Persch | May 1, 1923 |
| 1,751,117 | Wietzel | Mar. 18, 1930 |
| 1,894,785 | Peck | Jan. 17, 1933 |
| 1,899,887 | Thiele | Feb. 28, 1933 |
| 1,984,380 | Odell | Dec. 18, 1934 |
| 2,231,231 | Subkow | Feb. 11, 1941 |
| 2,338,881 | Thomas | Jan. 11, 1944 |
| 2,341,193 | Scheineman | Feb. 8, 1944 |
| 2,347,682 | Gunness | May 2, 1944 |
| 2,367,351 | Hemminger | Jan. 16, 1945 |
| 2,378,342 | Voorhees et al. | June 12, 1945 |
| 2,383,636 | Wurth | Aug. 28, 1945 |

FOREIGN PATENTS

| Number | Country | Date |
|---|---|---|
| 346,967 | Great Britain | Apr. 23, 1931 |
| 533,037 | Germany | Sept. 8, 1931 |